Patented June 22, 1937

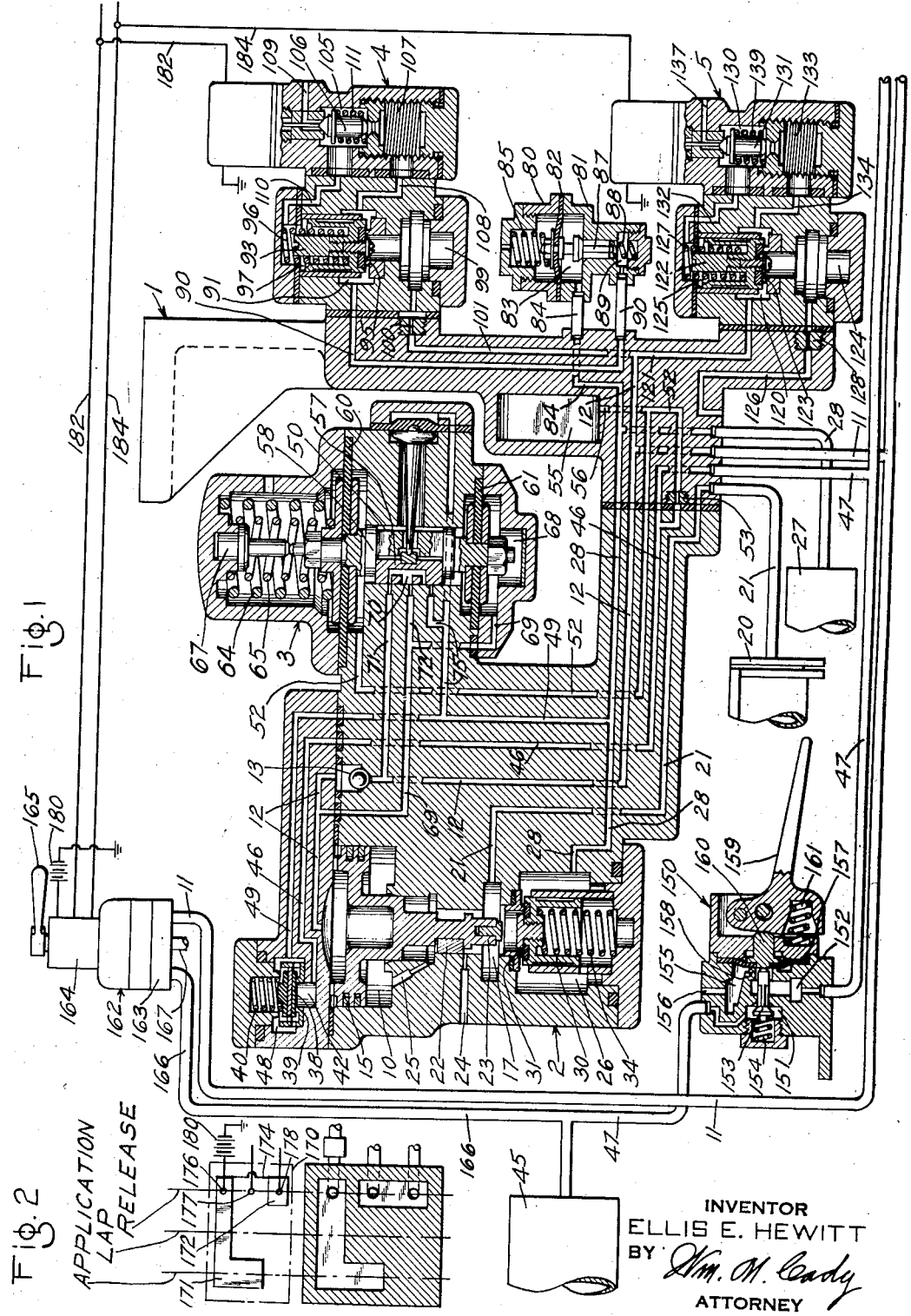

2,084,684

UNITED STATES PATENT OFFICE 2,084,684

BRAKE CONTROL VALVE

Ellis E. Hewitt, Edgewood, Pa., assignor to The Westinghouse Air Brake Company, Wilmerding, Pa., a corporation of Pennsylvania Application July 13, 1935, Serial No. 31,224

14 Claims. (Cl. 303—15)

This invention relates to electropneumatic brakes and more particularly to a system in which the brakes may be controlled both electrically and pneumatically.

Braking systems are now in use which employ a brake pipe to supply fluid under pressure to a reservoir from which fluid is supplied to the vehicle brake cylinders to effect an application of the brakes. The supply of fluid to the brake cylinder from the reservoir, and the release of fluid from the brake cylinder to the atmosphere is controlled by means of a relay valve which is normally controlled by variations in the pressure of the fluid in a control pipe.

In this system the pressure of the fluid in the control pipe is controlled by means of an engineer's brake valve having a pneumatic portion which directly controls the supply and release of fluid under pressure to and from the control pipe, and an electric portion which controls the supply and release of fluid under pressure to and from the control pipe through magnet valves.

In this system a change-over valve is provided which is responsive to the pressure of the fluid in the brake pipe, and which operates on a reduction in the pressure of the fluid in this pipe below a predetermined value to cut off the control of the relay valve by the control pipe, and to supply fluid under pressure to the relay valve from the reservoir to operate this valve to effect an application of the brakes.

The change-over valve is also operable on an increase in the pressure of the fluid in the brake pipe to cut off the supply of fluid from the reservoir to the relay valve and to restore control of this valve to the control pipe.

In the system heretofore in use a limiting valve has been provided to cut off the flow of fluid to the relay valve from the reservoir when a predetermined pressure is reached, the limiting valve being operative only when the pressure of the fluid in the brake pipe has been reduced so that the change-over valve operates to cut off control of the relay valve by the control pipe.

The pressure established in the brake cylinder is governed by the pressure of the fluid supplied to the relay valve, and as this valve is controlled by the limiting valve, the supply of fluid to the brake cylinder is cut off when a predetermined pressure is established therein.

It is the principal object of this invention to provide a braking system of the type described and in which the change-over valve also serves as a limiting valve when fluid is supplied to the relay valve as a result of operation of the change-over valve in response to a reduction in the pressure of the fluid in the brake pipe.

A further object of this invention is to provide a braking system of the type described in which the change-over valve serves as a limiting valve, and in which means is provided to prevent a release of the brakes by a reduction in the pressure of the fluid in the control pipe during the time that the brakes are applied as a result of operation of the change-over valve in response to a reduction in the pressure of the fluid in the brake pipe.

Another object of the invention is to provide a braking system of the type described having electrically operated valves controlling the supply of fluid under pressure to the control pipe from a reservoir, and the release of fluid from the control pipe together with means subject to the pressure of the fluid in the reservoir and operated on a predetermined reduction in this pressure to cut off the supply of fluid from the reservoir to the control pipe, whereby the complete loss of pressure in the reservoir, as a result of the faulty operation of the electrically operated valves, or of the supply of fluid to the control pipe, at a time when the control pipe is broken or leaking, will be prevented.

A further object of the invention is to provide an improved braking system.

Other objects of the invention and features of novelty will be apparent from the following description taken in connection with the accompanying drawing, in which Fig. 1 is a diagrammatic view of one form of brake equipment embodying my invention; and Fig. 2 is a diagrammatic development of the manual control means employed in the system shown in Fig. 1.

As shown in the drawing the electropneumatic brake equipment provided by my invention may comprise a bracket section 1, to which is secured a relay valve portion 2, a change-over valve portion 3, an application magnet valve portion 4, and a release magnet valve portion 5.

The relay valve portion 2 may comprise a casing having a piston chamber 10 containing a piston 15. The chamber at one side of the piston is connected to the control pipe 11 by way of a passage 12 having a check valve 13 interposed therein which operates to permit fluid to flow from the control pipe to the piston chamber, but to cut off the flow of fluid from the piston chamber to the control pipe. The casing also has a valve chamber 17 which is connected to the brake cylinder 20 by way of the pipe and passage 21, and which contains a slide valve 22 adapted to be operated by the piston 15 through the medium of a stem 23, and controlling communication between the valve chamber 17 and the atmosphere by way of the passage 24. Fluid also flows from the valve chamber 17 to the piston chamber 10 on the lower side of the piston 15 by way of the passage 25, so that the piston 15 is subject to the opposing pressures of the fluid in the chamber above the piston, and of the fluid in the chamber below the piston, which will be the same as the pressure of the fluid in the brake cylinder 20.

The relay valve portion also includes the chamber 26 which communicates with the reservoir 27 by way of a passage and pipe 28, and this chamber contains a valve 30 normally urged into engagement with a seat rib 31 by means of a spring 34 in order to cut off communication between the chamber 26 and the valve chamber 17. The valve 30 is adapted to be engaged by the end of the piston stem 23 so as to be moved away from the seat rib 31, and thereby open communication between the chambers 17 and 26 and thus permit fluid to flow from the reservoir 27 to the brake cylinder 20.

The relay valve portion also has associated therewith a check valve device comprising a valve element 38 normally urged into engagement with a seat rib 39 by means of a spring 40. The chamber 42 within the seat rib 39 is connected to the main reservoir 45 by way of the passage 46 and the brake pipe 47, and the chamber 48 outside of the seat rib 39 is connected by way of the passage 49 to the passage 28 and thereby to the reservoir 27.

The change-over valve device 3 comprises a casing having a valve chamber 50, which is connected to the brake pipe 47 by way of the passage 52 which has a choke 53 interposed therein, and by the passage 46. The passage 52 also communicates with a pressure chamber 55 by way of a passage 56.

The valve chamber 50 contains a slide valve 57 which is controlled by a stem 58 which has secured thereto the diaphragms 60 and 61. The diaphragms 60 and 61 are of unequal diameter, the diaphragm 60 being substantially larger than the diaphragm 61.

The diaphragm 60 is subject on one side to the pressure of the fluid in the chamber 50 and is subject on the other side to the pressure of the springs 64 and 65.

A stop 67 is provided and engages the end of the stem 58 to limit upward movement of the stem 58, while the end of the stem 58 engages the wall of the valve chamber to limit downward movement of the stem.

The diaphragm 61 is subject on one side to the pressure of the fluid in the valve chamber 50, and is subject on the other side to the pressure of the fluid in the chamber 68 which communicates by way of the passage 69 with the chamber above the piston of the relay valve device.

The stem 58, therefore, is moved upwardly by the pressure of the fluid in the valve chamber 50 acting on the lower face of the diaphragm 60 and by the pressure of the fluid in the chamber 68 acting on the lower face of the diaphragm 61, and is urged downwardly by the pressure of the fluid in the valve chamber 50 acting upon the upper side of the diaphragm 61, and by the springs 64 and 65.

The slide valve 57 has a port 70 formed therein and controlling communication between the passage 71, which communicates with the control passage 12 on the side of the check valve 13 remote from the relay valve device, and the passage 72 which communicates by way of the passage 69 with the chamber above the piston of the relay valve device. The slide valve 57 also controls communication between the passage 75, which communicates with the reservoir 27 by way of the passage 49, and the passage 72 which communicates with the chamber above the piston of the relay valve device.

The port 70 in the valve 57 is arranged so that when the stem 58 is in the upper position, communication is established between the passages 71 and 72 and communication is cut off between the passages 75 and 72, while in the lower position of the stem 58, communication is cut off between the passages 71 and 72, and is established between the passages 75 and 72. The port 70 is also arranged so that in an intermediate position of the stem 58 communication is cut off between passage 72 and both of the passages 71 and 75. This is the lap position of the change-over valve device.

This equipment has a limiting valve associated therewith and comprises a pair of casing sections 80 and 81 having a diaphragm 82 secured therebetween. The diaphragm 82 is subject on one side to the pressure of the fluid in the chamber 83, which communicates by way of the pipe and passage 84 with the passage 28 and thereby with the reservoir 27, and is subject on the other side to a spring 85. The diaphragm 82 controls the operation of the valve 87 which is urged to the unseated position by a spring 88, and which controls communication between chamber 83 and the chamber 89, which is connected by way of the pipe and passage 90 with the chamber 91 in the application magnet valve device 4.

The application magnet valve device 4 comprises a casing having a chamber 91 therein in which is mounted a valve element 93 which is held in engagement with a seat rib 95 by means of a spring 96 and by the pressure of the fluid in the chamber 97 on the upper side of the valve element 93.

The valve element 93 is urged to the unseated position by the pressure of the fluid acting on the valve element outwardly of seat rib 95. The valve element 93 controls communication between the chamber 91 and the chamber 99 which is connected through a restricted passage 100 to a passage 101 which communicates with the control pipe passage 12.

The application magnet valve device also includes a casing section having a chamber 105 formed therein in which is mounted a double beat valve element 106 which controls communication between the chamber 105 and the chamber 107, which is in constant communication with the chamber 91 by way of a passage 108, and also controls communication between the chamber 105 and the atmosphere by way of the passage 109. The chamber 105 is in constant communication with the chamber 97 by way of the passage 110. The double beat valve element 106 is normally urged to its upper seated position by means of the spring 111, and on energization of the winding of the magnet valve device the valve element is moved to its lower seated position.

The release magnet valve device 5 comprises a casing having a chamber 120 therein which communicates by way of a passage 121 with the control pipe passage 12, and which has mounted therein a valve element 122 which is normally urged into engagement with a seat rib 123 by means of a spring 127 and by the pressure of the fluid in the chamber 125 on the upper side of the valve element 122. The valve element 122 is urged upwardly by the pressure of the fluid in the chamber 120 acting on the valve 122 outwardly of the seat rib 123. The valve element 122 controls communication between the chamber 120 and the chamber 124, which is in communication with the atmosphere by way of a choke or restricted passage 128 and the passage 126.

The release magnet valve device 5 also includes a casing section having a chamber 130 formed therein, in which is mounted a double beat valve element 131, and which is in constant communication with the chamber 125 by way of a passage 132. This casing section also has a chamber 133 therein which is in constant communication with the chamber 129 by way of a passage 134. The double beat valve element 131 controls communication between the chamber 133 and the chamber 130, and between the chamber 130 and the atmosphere by way of the passage 137. The valve element 131 is normally urged to its upper seated position by means of a spring 139, and is moved to its lower seated position upon energization of the winding of the release magnet valve device.

The brake pipe 47 has a foot valve device 150 interposed therein and comprising a casing having a chamber 151 formed therein which is in constant communication with the main reservoir 45, and a chamber 152 which is in constant communication with the brake pipe 47. Communication between the chamber 151 and the chamber 152 is controlled by means of the valve element 153 which is urged to its seated position by means of a spring 154.

The casing of the foot valve device 150 also has a chamber 155 formed therein which is in constant communication with the atmosphere by way of the passage 156.

Communication between the chamber 152 and the chamber 155 is controlled by a diaphragm 157 which is engageable with a seat rib 158. Movement of the diaphragm 157 is controlled by the foot pedal 159 acting through a stem 160. The foot pedal 159 is normally urged out of engagement with the stem 160 by means of a spring 161, but on the application of pressure to the foot pedal 159 the stem 160 forces the diaphragm 157 into engagement with the seat rib 158 to cut off communication between the chamber 152 and the chamber 155, and to move the valve element 153 to the unseated position against the pressure of the spring 154, and thereby permit fluid to flow from the main reservoir through the chamber 151 to the chamber 152 and therefrom to the pipe 47.

On the release of pressure from the foot pedal 159 the diaphragm 157 is moved to the right, as viewed in the drawing, due to the pressure of the spring 154 transmitted through the valve element 153 and to the pressure of the fluid within the seat rib 158. This permits the valve 153 to move to its seated position to cut off the flow of fluid from the main reservoir 45 and to permit the fluid in the brake pipe 47 to escape to the atmosphere by way of the chamber 152, the chamber 155 and the passage 156.

For controlling the brakes a combined brake switch and brake valve device 162 is provided and may comprise a pneumatic portion 163 for controlling the pressure of the fluid in the control pipe in the usual manner, and an electric portion 164 for controlling the pressure of the fluid in the control pipe by electrically controlled means.

The pneumatic portion of the combined brake switch and brake valve device 162 comprises a rotary valve operated by the handle 165 and controlling communication between the supply pipe 166, which communicates with the main reservoir 45, and the control pipe 11, being adapted in one position of the handle 165 to permit fluid to flow from the main reservoir by way of the pipe 166 to the control pipe 11. The rotary valve also includes means operable in another position of the handle 165 to connect the control pipe 11 with the exhaust passage 167 so that fluid under pressure in the control pipe 11 is released to the atmosphere, and in still another position of the handle 165, the rotary valve cuts off communication between the supply pipe 166 and the control pipe 11 and between the control pipe 11 and the exhaust passage 167.

The electric portion 164 of the combined brake switch and brake valve device may comprise a movable drum 170 on which is mounted contacts 171 and 172 which are electrically connected together by means of a wire 174, and which are adapted to engage at different times the contacts 176, 177 and 178 for electrically controlling the operation of the brakes.

The contact 176 is connected by means of a suitable conductor to a suitable source of power, such as a battery 180, the other terminal of which is connected to ground. The contact 177 is connected by means of a wire 182 to one terminal of the winding of the application magnet valve 4, the other terminal of which is connected to the ground. The contact 178 is connected by means of a wire 184 with one terminal of the winding of the release magnet valve 5, the other terminal of which is connected to the ground.

In operation, assuming that the main reservoir 45 is charged with fluid under pressure to a predetermined pressure, and that the operator presses upon the pedal 159 of the foot valve device 150 so as to establish communication through the brake pipe 47, fluid under pressure will be supplied by way of the brake pipe 47 to the passage 46 to move the check valve 38 to the unseated position and fluid will then flow past the valve 38 to the passage 49, and therefrom to the passage 28 which communicates with the reservoir 27. Fluid under pressure also flows from the brake pipe 47 through the choke 53 to the passage 52 and therefrom to the valve chamber 58 in the change-over valve device, and also by way of the passage 56 to the pressure chamber 55.

When a predetermined pressure is established in the valve chamber 56, fluid under pressure acting on the diaphragm 60 urges the stem 58 upwardly into engagement with the stop 67, thereby moving the valve 57 to a position to establish communication between the passages 71 and 72.

Fluid supplied past the check valve 38 to the passage 29 also flows by way of the passage and pipe 84 to the chamber 83 of the limiting valve device, and on an increase in the pressure of the fluid in this chamber to a predetermined value the diaphragm 82 is moved upwardly against the spring 85, thereby permitting the spring 88 to move the valve 87 away from its seat. Fluid may thereupon flow from the chamber 83 to the chamber 89 and thence by way of the pipe and passage 90 to the chamber 91 in the application magnet valve device 4. Fluid supplied to the chamber 91 flows by way of the passage 108 to the chamber 107 and past the unseated valve 106 to the chamber 97 on the spring side of the valve 93 so that the valve 93 is held in engagement with the seat rib 95, thereby preventing the supply of fluid to the chamber 99 and to the control pipe 12.

Assuming that the brake valve handle 165 is in the release position fluid under pressure will be released from the control pipe 11 through the port in the rotary valve in the pneumatic section of the combined brake switch and brake valve, and at the same time the contact 172 on the drum 170 of the switch portion of the combined brake switch and brake valve will engage the contact 178 and thereby complete a circuit through the winding of the release magnet valve device 5.

When the winding of this magnet valve device is energized the valve element 131 is forced downwardly against the pressure of the spring 139, thereby cutting off the flow of fluid from the chamber 133 to the chamber 125 on the upper side of the valve element 122, and permitting the fluid in the chamber 125 to escape by way of the passage 132, the chamber 130 and the release passage 127. When fluid is vented from the chamber 125 the valve element 122 is forced upwardly by the pressure of the fluid in the chamber 120 acting on the portion of the valve element outside of the seat rib 123, thereby opening communication between the chamber 120 and the atmosphere by way of the chamber 124, the restricted passage 128 and the passage 126. Fluid, therefore, is released from the control pipe 11 both by way of the release magnet valve device, and by way of the pneumatic portion of the brake controlling valve.

When it is desired to apply the brakes the handle 165 of the combined brake switch and brake valve device is moved to the application position, and the ports in the rotary valve in the pneumatic section 163 of the combined brake switch and brake valve device establish communication between the pipe 166, which leads from the main reservoir 45, and the control pipe 11 so that fluid under pressure is supplied to the control pipe. At the same time the contact 171 engages the contact 177 so as to complete a circuit through the winding of the application magnet valve device 4, while the contact 172 is moved out of engagement with the contact 178 so that the circuit through the winding of the release magnet valve device is interrupted.

When the circuit through the winding of the application magnet valve device is completed the valve element 106 is moved downwardly against the spring 111 to its lower seated position, thereby cutting off the supply of fluid under pressure from the chamber 107 to the chamber 97 on the upper side of the valve element 93. At the same time the fluid under pressure in the chamber 97 is released to the atmosphere by way of the passage 109. When the fluid is released from the chamber 97 the valve element 93 is moved upwardly by the pressure of the fluid in the chamber 91 acting on the valve outwardly of the seat rib 95, and fluid under pressure then flows from the reservoir 27 by way of the pipe and passage 28, passage 84, the limiting valve device and the passage 90 to the chamber 99, and therefrom through the restricted communication 100 to the passage 101 and then to the control passage 12.

The fluid which is supplied to the control passage 12 flows past the check valve 13, and then to the chamber above the piston of the relay valve device.

Fluid supplied to the control passage 12 by the application magnet valve device 4, or by the pneumatic portion of the engineer's brake valve device, flows by way of the passage 121 to the chamber 120 of the release magnet valve device 5. Fluid supplied to the chamber 120 flows therefrom by way of the passage 134 to the chamber 133. As the winding of the release magnet valve device is deenergized at this time the double beat valve 131 is held in the upper seated position by the spring 139, and fluid supplied to the chamber 133 may flow past the valve 131 to the chamber 130 and therefrom by way of the passage 132 to the chamber 125 on the spring side of the valve 122 where it acts upon the valve 122 to hold it in engagement with the seat rib 123 and thereby prevent the release of fluid from the control passage 12.

The pressure of the fluid in the chamber of the relay valve device on the upper side of the piston 15 forces the piston downwardly with the result that the slide valve 22 cuts off the exhaust communication 24, and the end of the stem 23 engages the valve 30 so that the valve is moved downwardly against the spring 34.

When the valve 30 is unseated fluid under pressure flows from the reservoir 27 by way of the pipe and passage 28 to the chamber 26, and then to the chamber 17, and therefrom by way of the passage and pipe 21 to the brake cylinder 20 to effect an application of the brakes.

At the same time fluid under pressure in the chamber 17 flows by way of the passage 25 to the chamber on the lower side of the piston 15, and when the pressure of the fluid in this portion of the chamber builds up to the same value as the pressure of the fluid in the chamber above the piston 15, the piston will be moved upwardly so as to permit the valve 30 to seat on the seat rib 31 and thereby cut off the further flow of fluid under pressure from the reservoir to the brake cylinder.

If the pressure of the fluid in the chamber 17, and hence in the chamber on the lower face of the piston 15, exceeds the pressure of the fluid in the chamber above the piston 15 the piston will move upwardly until the slide valve 22 uncovers the exhaust port 24. Fluid will then be released until the pressure of the fluid in the brake cylinder is reduced to the same value as the pressure of the fluid in the chamber above the piston 15, which is the pressure of the fluid in the control pipe, at which time the piston 15 will move downwardly so that the valve 22 laps the exhaust passage 24.

It will be seen, therefore, that the relay valve operates to control the pressure of the fluid in the brake cylinder in response to the variations in the pressure in the control pipe 11, and to maintain the pressure of the fluid in the brake cylinder substantially the same as that in the control pipe.

When the desired degree of application of the brakes has been secured the handle 165 of the combined brake switch and brake valve is moved to the lap position, in which position the windings of both the application magnet valve device and the release magnet valve device are deenergized, while the pneumatic portion of the combined brake switch and brake valve operates to cut off the supply of fluid from the main reservoir to the control pipe, and to cut off the release of fluid from the control pipe to the atmosphere.

As a result of movement of the handle 165 of the combined brake switch and brake valve to the lap position the pressure of the fluid in the control pipe 11 is maintained, and the relay valve device operates to maintain the pressure in the brake cylinder at substantially the same value.

If at this time it is desired to increase the degree of application of the brakes the handle 165 of the combined brake switch and brake valve is moved to the application position, in which position the winding of the application magnet valve device 4 is energized, thereby effecting the supply of fluid under pressure to the control passage 12 by way of the application magnet valve device, and at the same time the rotary valve in the pneumatic portion of the combined brake switch and brake valve is moved to a position to supply fluid under pressure to the control pipe 11 from the main reservoir 45 by way of the pipe 166. When the pressure of the fluid in the passage 12 is increased the pressure of the fluid in the chamber above the piston of the relay valve is similarly increased, and the relay valve operates to produce a similar increase in the pressure of the fluid in the brake cylinder.

If it is desired to release the brakes the handle 165 of the combined brake switch and brake valve is moved to the release position, in which position the contact 172 engages the contact 178 to complete a circuit through the winding of the release magnet valve device 5, and thereby effect the release of fluid under pressure from the control pipe passage 12, while the rotary valve in the pneumatic portion of the combined brake switch and brake valve is moved to a position to release fluid from the control pipe 11 to the atmosphere by way of the atmospheric exhaust passage 167.

When fluid is released from the control pipe 11 and the passage 12, fluid is also released from the chamber in the relay valve device above the piston 15, assuming that the change-over valve device has remained in the position in which it is shown in Fig. 1 of the drawing, and on a reduction in the pressure of the fluid in the chamber above the piston of the relay valve device, this valve operates to reduce the pressure in the brake cylinder a similar amount.

If during the operation of the system the pressure of the fluid in the brake pipe 47 is reduced below a predetermined value as a result of the release of pressure on the pedal 159 of the foot valve device 150, either intentionally or otherwise, or if the pressure of the fluid in this pipe is reduced as a result of the parting of the cars in a train, the pressure of the fluid in the passage 52, and in the valve chamber 50 of the change-over valve device will be reduced, while the check valve 38 will prevent the release of fluid from the reservoir 27 to the atmosphere.

When the pressure of the fluid in the valve chamber 50 of the change-over valve portion is reduced below a predetermined value, the stem 58 is urged downwardly by the springs 64 and 65, and the slide valve 57 is moved to a position in which communication is cut off between the passages 71 and 72, and in which communication is established between the passage 75 and the passage 72, with the result that fluid under pressure is supplied from the reservoir 27 by way of the pipe and passage 28, the passage 49 and the passage 75 to the port 70 in the slide valve 57, and therefrom to the passage 72, which connects with the passage 69 leading to the chamber above the piston in the relay valve device and which by-passes the check valve 13. At the same time fluid flows by way of the passage 69 to the chamber 68 on the lower side of the diaphragm 61. Fluid continues to flow to the relay valve chamber and to the chamber 68 until the pressure of the fluid in the chamber 68 has built up to a value sufficient to force the stem 58 upwardly against the springs 64 and 65. When this pressure is reached in the chamber 68 the stem 58 will move upwardly so that the slide valve 57 moves to the lap position, in which position the passage 72 is cut off from both the passages 71 and 75.

As a result of the supply of fluid under pressure to the chamber in the relay valve device above the piston 15 this valve operates to supply fluid under pressure to the brake cylinder 20 from the reservoir 27 until the pressure of the fluid in the brake cylinder equals that in the chamber of the relay valve device, which will be the same as that in the chamber 68 of the change-over valve portion. This insures that in the event of loss of pressure in the brake pipe 47 the brakes will be automatically applied to a predetermined degree.

When the slide valve 57 of the change-over valve portion is in its lower position, that is in the position in which communication is established between the passage 75 and the passage 72, or is in the lap position, in which position the passage 72 is cut off from both the passages 71 and 75, the release of fluid from the control pipe 11 and the passage 12 associated therewith is ineffective to release fluid from the chamber above the piston of the relay valve as the check valve 13 cuts off communication through the passage 12, and the change-over valve cuts off communication by way of the by-pass passage 69. Therefore, until the pressure of the fluid in the brake pipe 47 is increased to a predetermined high value sufficient to force the stem 58 of the change-over valve to move to its upper position so that the port 70 in the slide valve 57 again establishes communication between the passages 71 and 72, the brakes will be held applied, and cannot be released. As soon, however, as the pressure of the fluid in the brake pipe 47 is reestablished, the operator will again have normal control of the brake system, and can release the brakes by releasing the pressure in the control pipe 11.

It will be seen, therefore, that the change-over valve portion operates not only to change the system over from normal control by the operator, at which time the operator can regulate the application and release of the brakes by varying the pressure of the fluid in the control pipe, to a condition in which the brakes are automatically applied by fluid under pressure supplied from the reservoir on the vehicle, but that this valve portion also operates to regulate the degree of pressure established in the brake cylinder when the brakes are applied as a result of movement of the change-over valve device to the latter position.

The system provided by this invention includes the limiting valve device which is interposed in the passage between the reservoir 27 and the application magnet valve device 4.

If for any reason one of the magnet valve devices should be rendered inoperative and stick in an open position, and at the same time the fluid in the control pipe 11 were released, either intentionally or otherwise, all of the fluid under pressure in the reservoir 27 would escape to the atmosphere by way of the control pipe 11. The limiting valve device operates to prevent this occurrence.

The limiting valve includes the valve element 87 controlled by the diaphragm 82, and when the pressure of the fluid in the chamber 83, which is in constant communication with the reservoir 27, falls to a predetermined low value the spring 85 presses the diaphragm downwardly and moves the valve element 87 to its closed position, thereby shutting off the flow of fluid from the reservoir to the application magnet valve device and therefrom to the control pipe 11.

The limiting valve device, therefore, operates to shut off the flow of fluid from the reservoir 27 to the control pipe 11 in the event that the pressure of the fluid in the reservoir 27 falls below a predetermined low value. This prevents the complete loss of fluid from the reservoir 27 by way of the control pipe 11.

After operation of the limiting valve to cut off the supply of fluid under pressure to the control pipe by means of the application magnet valve, the operator is able to effect an application of the brakes by means of the pneumatic portion of the engineer's brake valve which may be operated to supply fluid to the control pipe and thereby to the relay valve device to effect the application of the brakes.

If the operator is unable to effect an application of the brakes by supplying fluid to the control pipe by operation of the engineer's brake valve, he may effect an application of the brakes by releasing pressure from the foot pedal 159, which results in the release of fluid from the brake pipe 47, and on a reduction in the pressure in this pipe, the change-over valve device 3 operates to supply fluid to the relay valve device and thereby produce an application of the brakes.

While a preferred embodiment of brake system provided by my invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising a movable abutment subject on one side to the pressure of the fluid in a chamber in the valve device, and valve means responsive at all times to the pressure of the fluid in the relay valve device chamber and in the brake pipe for controlling the flow of fluid from the reservoir to the chamber in the relay valve device.

2. In a braking system, a brake cylinder, a reservoir, a brake pipe, means for supplying fluid under pressure to the brake pipe, means for supplying fluid under pressure to the reservoir, a relay valve device comprising a valve element controlling the flow of fluid from the reservoir to the brake cylinder and controlled by means subject to the opposing pressures of the fluid in the brake cylinder and of the fluid in a chamber in the relay valve device, and valve means responsive at all times to the pressure of the fluid in the relay valve device chamber and in the brake pipe for controlling the flow of fluid from the reservoir to the chamber in the relay valve device.

3. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means controlling communication through said by-pass passage.

4. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of the fluid in the relay valve device chamber for controlling communication through said by-pass passage.

5. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of the fluid in the brake pipe for controlling communication through said by-pass passage.

6. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of the fluid in the relay valve chamber for controlling the flow of fluid from the reservoir to the relay valve device chamber and controlling communication through said by-pass passage.

7. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of the fluid in the relay valve device chamber and to the pressure of the fluid in the brake pipe for controlling communication through said by-pass passage.

8. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of the fluid in the brake pipe for controlling the flow of fluid from the reservoir to the relay valve device chamber and controlling communication through said by-pass passage.

9. In a braking system, a brake cylinder, a reservoir, a brake pipe, means for supplying fluid under pressure to the brake pipe, means for supplying fluid under pressure to the reservoir, a relay valve device controlling the flow of fluid from the reservoir to the brake cylinder, the relay valve device comprising an abutment subject to the pressure of the fluid in a chamber in said relay valve device, a control pipe communicating with said relay valve chamber, a check valve in the passage between the control pipe and the relay valve chamber and operable to permit fluid to flow from the control pipe to the relay valve chamber and to cut off the flow of fluid from the relay valve chamber to the control pipe, a passage communicating with the relay valve chamber and with the control pipe and by-passing the check valve, and valve means responsive to the pressure of fluid in the relay valve chamber and to the pressure of fluid in the brake pipe for controlling the flow of fluid from the reservoir to the relay valve device chamber and controlling communication through said by-pass passage.

10. In a braking system, in combination, a brake cylinder, a brake pipe, a relay valve device operated by an increase in fluid pressure in a chamber therein for supplying fluid under pressure to the brake cylinder, and a valve device subject to and operated upon a reduction in brake pipe pressure for supplying fluid under pressure to said relay valve device and subject at all times to and operated by a predetermined increase in the pressure of fluid supplied to said relay valve device chamber for cutting off the supply of fluid under pressure to said relay valve device.

11. In a braking system, in combination, a brake cylinder, a brake pipe, a relay valve device operated by an increase in fluid pressure in a chamber therein for supplying fluid under pressure to the brake cylinder, and valve means comprising a valve for controlling the supply of fluid under pressure to said relay valve device chamber and movable abutments for operating said valve, one of said abutments being subject to brake pipe pressure and the other abutment being subject at all times to the pressure of fluid supplied to said relay valve device by said valve means.

12. In a braking system, a brake cylinder, a reservoir, a brake pipe, means for supplying fluid under pressure to the brake pipe, means for supplying fluid under pressure to the reservoir, a relay valve device operated by an increase in fluid pressure for supplying fluid under pressure from said reservoir to the brake cylinder, valve means subject to and operated upon a reduction in brake pipe pressure for supplying fluid under pressure to the relay valve device, and subject to and operated by a predetermined increase in the pressure of fluid supplied to said relay valve device for cutting off the supply of fluid under pressure to said relay valve device, electrically controlled valve means for supplying fluid under pressure to the relay valve device from said reservoir, and means subject to and operated upon a reduction in the pressure of the fluid in the reservoir for cutting off the supply of fluid from the reservoir to the relay valve device by said electrically controlled valve means.

13. In a braking system, in combination, a brake pipe, a brake cylinder, a reservoir, a relay valve device operated by an increase in fluid pressure for supplying fluid under pressure from the reservoir to the brake cylinder, a valve device subject to and operated upon a reduction in brake pipe pressure for supplying fluid under pressure to said relay valve device, and subject to and operated by a predetermined increase in the pressure of fluid supplied to said relay valve device for cutting off the supply of fluid under pressure to the relay valve device, electrically controlled valve means for supplying fluid under pressure from the reservoir to the relay valve device, and means subject to and operated by a predetermined reduction in the pressure of the fluid in said reservoir for cutting off the supply of fluid from the reservoir to the relay valve device by said electrically controlled valve means.

14. In a braking system, in combination, a brake cylinder, a brake pipe, a reservoir, a relay valve device operated by an increase in fluid pressure for supplying fluid under pressure from the reservoir to the brake cylinder, and a valve device subject to and operated upon a reduction in brake pipe pressure for supplying fluid under pressure from the reservoir to the relay valve device, and subject to and operated by a predetermined increase in the pressure of the fluid supplied to the relay valve device by said valve device for cutting off the supply of fluid under pressure from said reservoir to the relay valve device.

ELLIS E. HEWITT.